Dec. 29, 1953  B. F. WOJCIK  2,663,946
COMPARATOR
Filed June 12, 1952
Fig. 1.
Fig. 2.
Fig. 3.
Fig. 4.
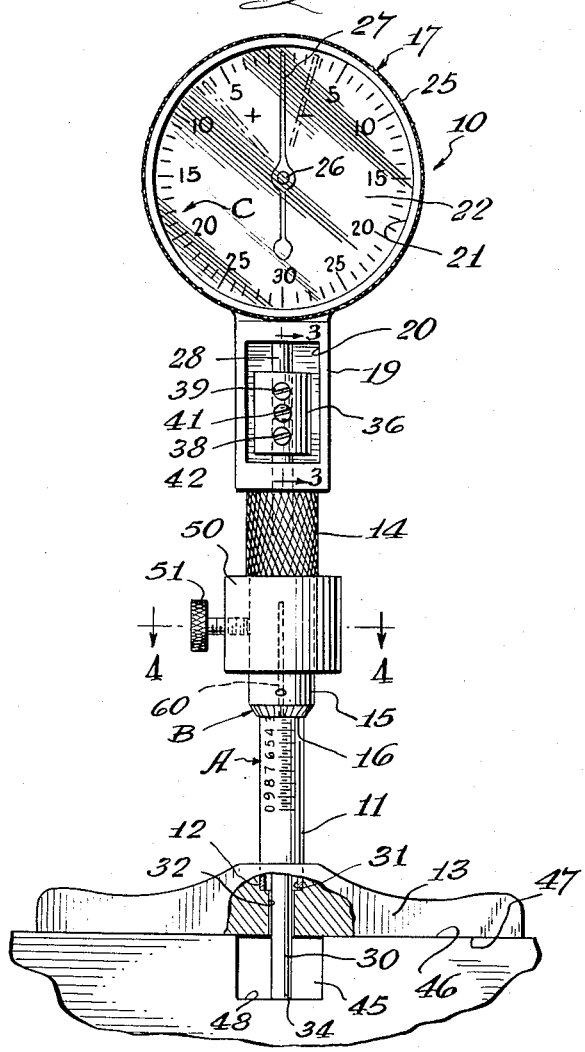
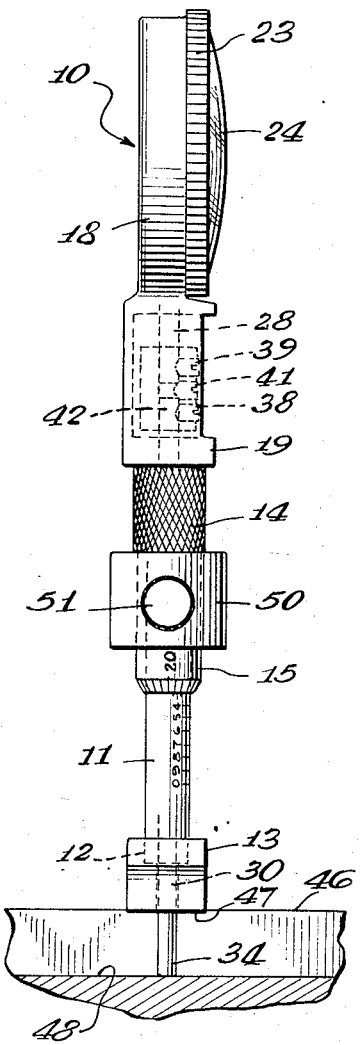
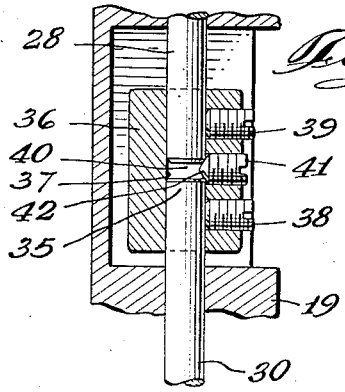
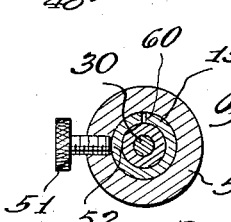
Inventor
Bernard F. Wojcik
By J. Irving Silverman
Attorney Patented Dec. 29, 1953

2,663,946

UNITED STATES PATENT OFFICE 2,663,946

COMPARATOR

Bernard Frank Wojcik, Chicago, Ill.

Application June 12, 1952, Serial No. 293,115

6 Claims. (Cl. 33—172)

This instrument relates generally to measuring instruments and more particularly is concerned with a measuring instrument adapted for comparing the actual dimension of a hole or groove in a work surface with a desired predetermined dimension for said hole or groove.

Generally, the measuring instrument embodying the invention is of the micrometer type, but which has been designed to provide a novel instrument of the character hereinafter described. Thus, the instrument includes a rotatable shaft having a sleeve mounted thereon, rotatable one relative to the other, said shaft having a calibrated portion providing calibrations forming a linear scale over which said sleeve is slidable for setting a particular dimension on the instrument. In addition, I provide an accurate indicator attached to the head of the micrometer and a push-rod attached through the center of the shaft to the indicator to actuate the same when the push-rod is moved. When a desired dimension is set on the scale by rotating the shaft, the push-rod simultaneously is caused to protrude from the micrometer a predetermined distance corresponding to said desired dimension. In checking the dimension of a depression in a work surface, the desired dimension for the depression first is set on the micrometer scale, whereby simultaneously the push-rod will be caused to protrude from the micrometer a certain amount. The protruding end of the rod is then inserted into the depression until it engages the bottom thereof, at which time one of three conditions may be indicated by the said indicator. If the dimension of the hole is equal to the predetermined dimension set on the micrometer scale, the reading on the indicator will be zero. If the dimension of the depression either is greater or less than the predetermined dimension, a reading will be obtained directly on the indicator which gives the differential between the actual and predetermined dimension of the hole. The indicator is graduated to give readings in thousandths of an inch and is provided with a dial giving both plus and minus differential readings.

Accordingly, it is a principal object of the invention to provide a measuring instrument of the character described adapted to give more accurate readings than heretofore possible for such instruments and which is characterized by its relatively simple, economical and uncomplicated construction.

Another object of the invention is to provide novel means in a measuring instrument of the character described for coupling the push-rod to the indicator device so that the rod may be easily adjusted for zero readings of the said indicator.

Another important object of the invention is to provide means in a measuring instrument of the character described permitting rapid replacement and interchangeability of the said push-rods.

Still another object of the invention is to provide a measuring instrument of the character described which is adapted to give readings directly in thousandths of an inch of the difference between the actual and desired dimension of a depression in a work surface.

These and other objects of the invention will become apparent as the description thereof proceeds, in conjunction with which a preferred embodiment of the invention has been set forth in the accompanying drawing. With all of these objects in view, the invention resides in the constructional details, arrangement and combination of parts to be more fully described and claimed. Although minor variations in such details, size and proportion of the parts and arrangement thereof may occur to the artisan skilled in the art to which the invention appertains, such variations may be had without departing from the scope of the invention.

In the drawings:

Fig. 1 is a front elevational view of the measuring instrument embodying the invention.

Fig. 2 is a side elevational view of the same.

Fig. 3 is a sectional view taken through the said instrument along the line 3—3 of Fig. 1 and in the direction indicated.

Fig. 4 is a sectional view taken through the locking means of the said instrument along the line 4—4 of Fig. 1 and in the direction indicated.

Referring now to the drawings, the measuring instrument embodying the invention is designated generally by the reference character 10. Same includes a rotatable shaft 11 to one end 12 of which is fixedly secured a block member 13, the opposite end of the shaft being threadedly engaged in the head 14 of the said instrument in a conventional manner. The shaft 11 is provided with a calibrated portion forming a linear scale thereon indicated generally at A. A sleeve 15 is mounted over shaft 11 rotatable relative thereto, said sleeve being slidable over the scale A and having calibrations forming scale B along the edge 16 thereof. The block and shaft are adapted to be rotated together so as to slide the sleeve 15 over the scale A and dispose the edge 16 opposite a calibration thereon so that in cooperation with the calibrations of scale B linear readings up to thousandths of an inch may be set on the instrument.

The instrument as thus far described is of the conventional micrometer type. The invention is believed to reside in the combination and construction hereinafter described which adapts the said instrument for comparing the actual dimension of a depression in a work surface with the desired predetermined dimension therefor which can be set on the micrometer scale A.

Attached to the head 14 is an accurate indicator 17 of conventional construction, the indicator being fixed relative to the sleeve. Same includes a casing 18 in which the operating mechanism (not shown) of the indicator is housed, an annular extension 19 having a chamber 20 therein, an opening 21 in one face of the indicator in which a dial 22 is mounted and a cap 23 having a glass cover plate 24 movably secured over said face of the indicator permitting the dial to be observed. The peripheral edge of the cap 23 is serrated as at 25 to enable grasping same. The dial 22 has an opening in the center thereof through which the shaft 26 extends, and a pointer 27 is fixedly secured on said shaft. The shaft 26 also is connected to said operating mechanism. The extension 19 is mounted over the free end of the head 14 with the chamber 20 arranged above the said free end. Depending into the chamber 20 is a stem 28 which is operatively connected to the operating mechanism of the indicator so that movement of the stem upwardly as viewed in Fig. 1 will actuate the said mechanism to rotate the shaft 25 and hence the pointer 26. The face of the dial 22 is provided with calibrations forming the scale designated C and is movable a limited amount for zero adjustment.

As seen in Fig. 1, the scale C is calibrated so that identical markings are disposed both to the right and left of the zero point opposite which the pointer 27 is shown in the drawing. The side to the left has been designated plus (+) and the side to the right has been designated minus (−). As explained above, the instrument 10 is in the nature of a comparator, namely, it is intended that the instrument compare the actual dimension of the depression measured with the desired dimension therefor set on the scale A. If the actual dimension is less than the desired dimension, a reading will be obtained on the minus (−) side of the scale C. If the actual dimension is longer, then the reading will be obtained on the plus (+) side. The scale C has been calibrated to give readings up to thousandths of an inch so that it will be appreciated that very accurate readings of such a differential between the actual and desired dimension can be obtained.

The means I provide for actuating the indicator 17 comprises an elongate push-rod 30 slidably received in a bore 31 provided in the shaft 11 throughout its extent. The block member 13 has a passageway 32 having an enlarged portion 33 in which the end 12 of the shaft is received, the passageway 32 and portion 33 being aligned with the bore 31. The end 34 of said shaft is adapted to be reciprocated in and out of the passageway 32. The opposite end 35 of the shaft is coupled to the indicator 17.

Referring to Fig. 1, the said end 35 will be seen to be disposed in the chamber 20. A coupling member 36 having a passageway 37 therethrough is disposed in said chamber, the end 35 being secured in one extremity of the passageway 37 by means of a screw 38 threaded into member 36. The stem 28 is secured in the opposite extremity of the passageway 37 by means of screw 39 threaded into member 36. The screws 38 and 39 are arranged respectively to bear against the rod 30 and stem 28 when said screws are tightened. It will thus be apparent that movement of the rod 30 will result in movement of stem 28 actuating the indicator 17 to give a reading on scale C.

Referring to Fig. 3, the rod 30 is shown coupled to the member 36, as is the stem 28. A space 40 separates the respective ends of the rod and stem. Threaded into the member 36 at a point opposite space 40 is a screw 41 having a pointed end 42 adapted to enter the space 40 and space the ends of the rod 30 and stem 28. Thus, the rod 30 may be interchanged with rods of different length and properly adjusted in the member 36 by means of the spacer screw 41.

The operation of the instrument 10 is simple and expeditious. Presume that it is desired to compare the dimension of a depression 45 in a work surface 46 as shown in Fig. 1. The desired predetermined dimension for the hole 45 for illustrative purposes, will be taken as .30 inch. With the instrument out of the hole, the end 34 of rod 30 will protrude out of the block member 13 a certain distance. The instrument is placed on the surface 46 at a point other than the depression 45 and pressed downwardly until the end 34 is flush with the bottom edge 47 of member 13. The pointer 27 will rotate with movement of the rod 30 as it is pressed against the surface 46 and will come to rest when the end 34 is flush with the edge 47. If the pointer comes to rest opposite a calibration other than zero (which occurs in most instances), the cap 23 may be turned adjusting the pointer to zero reading. At zero reading of the indicator 17, the end 34 will protrude from the block 13 a small distance which is in the nature of a tare. The amount which end 34 will protrude at zero reading of the indicator 17 may also be varied by adjustment of screw 41.

The desired predetermined dimension of .30 inch is then set on the micrometer scale A. To accomplish this the instrument is lifted from the surface 46 and the block 13 and shaft 11 rotated together until the edge 16 of sleeve 15 is slid over shaft 11 to proper position on scale A giving a reading of .30 inch. This position is illustrated in Fig. 1. As the block and shaft are rotated, the end 34 will be caused to protrude beyond edge 47 a certain distance in addition to the original tare distance at zero reading of the indicator 17. In other words, the end 34 will protrude a distance equal to the .30 inch set on the scale A plus a tare distance corresponding to zero reading of the indicator.

To check the dimension of hole 45, the end 34 is placed in the hole until the same engages against the bottom wall 48 thereof. The instrument then is pressed down until the edge 47 engages flush against the work surface 46. Because of the additional tare distance the end 34 protrudes from the member 13 at zero reading of the indicator, one of three readings will be obtained on said indicator.

If the depth of hole 45 is equal to the predetermined dimension of .30 inch set on scale A, the rod 30 will be moved upward a distance corresponding to the tare distance at zero reading of the indicator and the pointer 27 will come to rest at the zero reading indicated in Fig. 1 in solid lines. If the depth of hole 45 is less than the predetermined dimension set on scale A, the rod 30 will be moved upwardly a smaller amount and the pointer will come to rest opposite a calibration on the minus (—) side of scale C, such a position of the pointer being illustrated in broken lines in Fig. 1. Naturally, if the depth of hole 45 is more than the desired predetermined dimension, the push-rod 30 will be moved a greater distance before the edge 47 is flush with surface 46 and the pointer 27 will come to rest opposite a calibration on the plus (+) side of the scale C. It will thus be seen that the differential between the actual dimension of the hole and desired predetermined dimension therefor will be obtained directly on the indicator 17, the readings obtained being either in plus (+) or minus (—) linear units depending on whether the depth of hole is more or less than the said predetermined desired dimension.

The scale C may be calibrated in any desirable manner. It may be graduated to give readings up to thousandths of an inch or any other units as may be desired. Likewise, the rod 30 may be interchanged with rods of greater or lesser length as the case may be. To this end, I may provide an opening in one wall of the extension 19 and a suitable cover plate (not shown) which can be mounted to cover the said opening. By loosening the screw 38, the rod 30 may be removed from the coupling member 36 and a different rod replaced therein readily and easily.

If the instrument is desired to be used to compare a series of depressions in a work surface, it would be desirable to have means for locking the sleeve member 15 in position at the predetermined dimension so that same will not be moved during manipulation of the instrument. Toward this end, attention is directed to Fig. 4, in which is shown a collar 50 adapted to be mounted over the sleeve 15 and a set screw 51 threadedly engaged through said collar adapted to have its end 52 biased against the said sleeve for locking same. Such locking means may be provided for preventing inadvertent movement of sleeve 15 thereby upsetting the position of rod 30. The sleeve 15 is slotted as at 60 to provide a chucking grip of shaft 11.

It will thus be seen that I have provided a novel measuring instrument for determining directly the differential in dimension between a depression in a work surface and a desired predetermined dimension for said depression. The said instrument is characterized by the easy and simple manner in which same is used, the flexibility of the instrument by providing for rapid and ready interchangeability of the push-rods and its simple, economical construction. It is believed that the invention has been described sufficiently without any necessity for further details. It is to be understood that many variations in size, proportion and arrangement of the parts are possible without departing from the spirit of the invention as defined in the appended claims.

I claim:

1. An instrument for comparing the actual dimension of a depression in a work surface with a predetermined dimension desired therefor, comprising a micrometer shaft having a conventional scale thereon, a micrometer sleeve on said shaft, said sleeve and shaft adapted to be telescoped one relative to the other with the sleeve indicating on said scale the amount of their telescoping corresponding to said predetermined dimension, an indicating device mounted on the sleeve, a gauging block having a gauging surface fixedly secured to the shaft, a push-rod extending through the sleeve, shaft and gauging block, means coupling one end of the rod to said indicating device, said rod having a portion thereof protruding from the gauging surface of said block, the length of the protruding portion for any relative position of the micrometer sleeve and shaft having a predetermined relationship with the indication of said indicating device, said indicating device having a hollow extension adapted to be fitted over said sleeve, a chamber in said extension spaced above sleeve, said coupling means being movably disposed in said chamber and comprising a coupling member having a passageway therethrough, said one end of the rod and indicating device being respectively secured in said passageway at opposite extremities of the passageway.

2. A comparator, comprising a micrometer sleeve and piston adapted to be rotated one relative to the other and having conventional indicia for indicating the amount of their telescoping, an indicator head mounted on the sleeve, a gauging block having a gauging surface fixedly secured to the piston, said piston and block each having a bore therethrough in alignment one with the other, a push-rod connected with the indicator and disposed in said bores and having a portion thereof protruding from the gauging surface of the block, the length of rod protruding for any relative position of micrometer sleeve and piston having a predetermined relationship with the indication of said indicator head, said indicator comprising a casing having a hollow extension secured to said sleeve and, an actuating stem depending into said hollow portion, said push-rod having an end thereof extending into said hollow portion and spaced from said stem, and a coupling member in said hollow portion for connecting said one end of the push-rod to said stem.

3. A comparator, comprising a micrometer sleeve and piston adapted to be rotated one relative to the other and having conventional indicia for indicating the amount of their telescoping, an indicator head mounted on the sleeve, a gauging block having a gauging surface fixedly secured to the piston, said piston and block each having a bore therethrough in alignment one with the other, a push-rod connected with the indicator and disposed in said bores and having a portion thereof protruding from the gauging surface of the block, the length of rod protruding for any relative position of micrometer sleeve and piston having a predetermined relationship with the indication of said indicator head, said indicator comprising a casing having a hollow extension secured to said sleeve and, an actuating stem depending into said hollow portion, said push-rod having an end thereof extending into said hollow portion and spaced from said stem, and a coupling member in said hollow portion for connecting said one end of the push-rod to said stem, said coupling member having a passageway therethrough having the stem and said one end of the rod respectively secured in said passageway spaced one from the other, and a screw member threaded through the coupling member for varying the space between the rod and stem.

4. A comparator, comprising a micrometer piston having a bore therethrough and a scale thereon, a rotatably mounted sleeve on said piston, the sleeve and piston adapted to be telescoped one relative to the other for setting a predetermined dimension on said scale, a gauging block having a passageway therethrough fixedly secured to the piston with the passageway aligned with the bore and having a gauging surface, an indicating head mounted on said sleeve movable therewith, a push-rod slidably disposed in said bore and passageway with an end thereof protruding beyond said gauging surface, the opposite end of the push rod being removably coupled to the indicator, the length of the rod protruding for any dimension set on the scale having a relationship to a reading obtained on said indicator when said protruding end is moved to a position flush with the said gauging surface such that the actual dimension of the thing measured may be compared with the predetermined dimension set on the scale, said indicator having a hollow extension secured to said sleeve forming a chamber spaced therefrom, and an actuating stem depending into said chamber, said opposite end of the rod extending into said chamber and adjustably coupled to said stem whereby movement of said protruding end will actuate the indicator to give an indication.

5. A comparator, comprising a micrometer piston having a bore therethrough and a scale thereon, a rotatably mounted sleeve on said piston, the sleeve and piston adapted to be telescoped one relative to the other for setting a predetermined dimension on said scale, a gauging block having a passageway therethrough fixedly secured to the piston with the passageway aligned with the bore and having a gauging surface, an indicating head mounted on said sleeve movable therewith, a push-rod slidably disposed in said bore and passageway with an end thereof protruding beyond said gauging surface, the opposite end of the push-rod being removably coupled to the indicator, the length of the rod protruding for any dimension set on the scale having a relationship to a reading obtained on said indicator when said protruding end is moved to a position flush with the said gauging surface such that the actual dimension of the thing measured may be compared with the predetermined dimension set on the scale, said indicator having a hollow extension secured to said sleeve forming a chamber spaced therefrom, and an actuating stem depending into said chamber, said opposite end of the rod extending into said chamber and adjustably coupled to said stem whereby movement of said protruding end will actuate the indicator to give an indication and locking means on said sleeve for locking same relative to the shaft.

6. An instrument for comparing the actual dimension of a depression in a work surface with a predetermined dimension desired therefor, comprising a micrometer shaft having a conventional scale thereon, a micrometer sleeve on said shaft, said sleeve and shaft adapted to be telescoped one relative to the other with the sleeve indicating on said scale the amount of their telescoping corresponding to said predetermined dimension, an indicating device mounted on the sleeve and having an actuating stem, a gauging block having a gauging surface fixedly secured on the shaft, a push-rod extending through the sleeve, shaft and gauging block, means coupling one end of the rod to said stem, said rod having a portion thereof protruding from the gauging surface of said block, the length of the protruding portion for any relative position of the micrometer sleeve and shaft having a predetermined relationship with the indication of said indicating device, said indicating device having a hollow, cylindrical extension mounted on said sleeve with said stem disposed in said hollow extension, said push-rod being coupled to said stem in the hollow extension whereby movement of the protruding portion of the rod will serve to actuate the indicator through the stem.

BERNARD FRANK WOJCIK.

References Cited in the file of this patent

UNITED STATES PATENTS

| Number | Name | Date |
| --- | --- | --- |
| 1,317,746 | Whatley | Oct. 7, 1919 |
| 1,647,802 | Josef | Nov. 1, 1927 |
| 1,673,480 | Ames | June 12, 1928 |
| 2,344,595 | Callow | Mar. 21, 1944 |
| 2,556,761 | Keene | June 12, 1951 |